US012731476B2

(12) United States Patent
Gauthier

(10) Patent No.: US 12,731,476 B2
(45) Date of Patent: Sep. 8, 2026

(54) SYSTEM FOR DETECTING FIRE OUTBREAKS COMPRISING A PLURALITY OF DETECTION DEVICES FORMING A MESHING

(71) Applicant: SYLVIACARE, Mettray (FR)

(72) Inventor: Franck Gauthier, Mettray (FR)

(73) Assignee: SYLVIACARE, Mettray (FR)

( * ) Notice: Subject to any disclaimer, the term of this patent is extended or adjusted under 35 U.S.C. 154(b) by 0 days.

(21) Appl. No.: 18/842,282

(22) PCT Filed: Feb. 7, 2023

(86) PCT No.: PCT/EP2023/053018

§ 371 (c)(1),
(2) Date: Aug. 28, 2024

(87) PCT Pub. No.: WO2023/165790

PCT Pub. Date: Sep. 7, 2023

(65) Prior Publication Data

US 2025/0182600 A1 Jun. 5, 2025

(30) Foreign Application Priority Data

Mar. 1, 2022 (FR) ....................................... 2201797

(51) Int. Cl.
*G08B 17/12* (2006.01)
*A62C 3/02* (2006.01)
(Continued)

(52) U.S. Cl.
CPC .......... *G08B 17/125* (2013.01); *A62C 3/0271* (2013.01); *G08B 17/005* (2013.01);
(Continued)

(58) Field of Classification Search
CPC .... G08B 17/125; G08B 17/005; G08B 25/10; A62C 3/0271; H02J 7/35; H02J 2300/24; H04W 84/18
See application file for complete search history.

(56) References Cited

U.S. PATENT DOCUMENTS 6,410,362 B1 * 6/2002 Simburger .......... H10F 77/1692
257/434
7,834,771 B2 * 11/2010 Lee ........................ H04N 23/20
340/539.22
(Continued)

FOREIGN PATENT DOCUMENTS

CN 111508192 A 8/2020
CN 111739248 A 10/2020
CN 112915427 A 6/2021

OTHER PUBLICATIONS

International Search Report dated Mar. 24, 2023, for corresponding International Application No. PCT/EP2023/053018, filed Feb. 7, 2023.

(Continued)

*Primary Examiner* — Quan Zhen Wang
*Assistant Examiner* — Rajsheed O Black-Childress
(74) *Attorney, Agent, or Firm* — David D. Brush; Westman, Champlin & Koehler, P.A.

(57) ABSTRACT

A system for detecting fire outbreaks, including: a plurality of detection devices forming a meshing of an area to be monitored; and a computer platform. Each detection device is configured to: acquire infrared images of the area to be monitored; detect a localized increase in infrared radiation; and if a localized increase in infrared radiation is detected, transmit a digital warning signal to the computer platform.

19 Claims, 3 Drawing Sheets

(51) Int. Cl.

| | |
|---|---|
| ***G08B 17/00*** | (2006.01) |
| ***G08B 25/10*** | (2006.01) |
| ***H02J 7/35*** | (2006.01) |
| ***H02J 101/24*** | (2026.01) |
| ***H04W 84/18*** | (2009.01) |

(52) U.S. Cl.

CPC ................ *G08B 25/10* (2013.01); *H02J 7/35* (2013.01); *H04W 84/18* (2013.01); *H02J 2101/24* (2026.01)

(56) References Cited

U.S. PATENT DOCUMENTS

| | | | | |
|---|---|---|---|---|
| 2003/0132847 | A1* | 7/2003 | Anderson | G08B 17/125<br>382/181 |
| 2012/0229283 | A1* | 9/2012 | Mckenna | G08B 29/183<br>340/584 |
| 2014/0192184 | A1* | 7/2014 | Wu | G08B 17/125<br>348/135 |
| 2019/0318598 | A1* | 10/2019 | Aponte Luis | H04W 4/90 |

OTHER PUBLICATIONS

Written Opinion dated Mar. 24, 2023, for corresponding International Application No. PCT/EP2023/053018, filed Feb. 7, 2023.

English Translation of the Written Opinion dated Apr. 3, 2023, for corresponding International Application No. PCT/EP2023/053018, filed Feb. 7, 2023.

* cited by examiner

[Fig. 1]
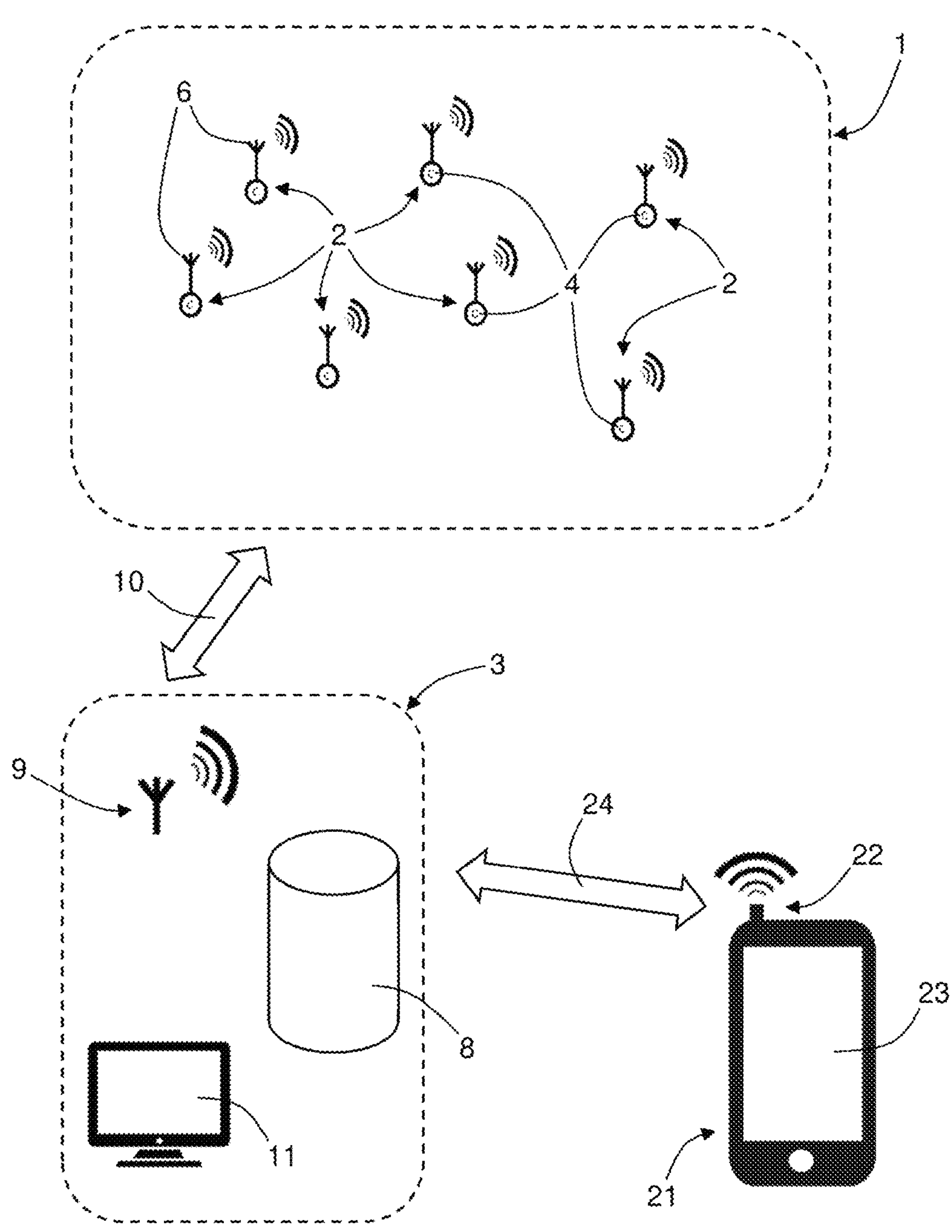

[Fig. 2]
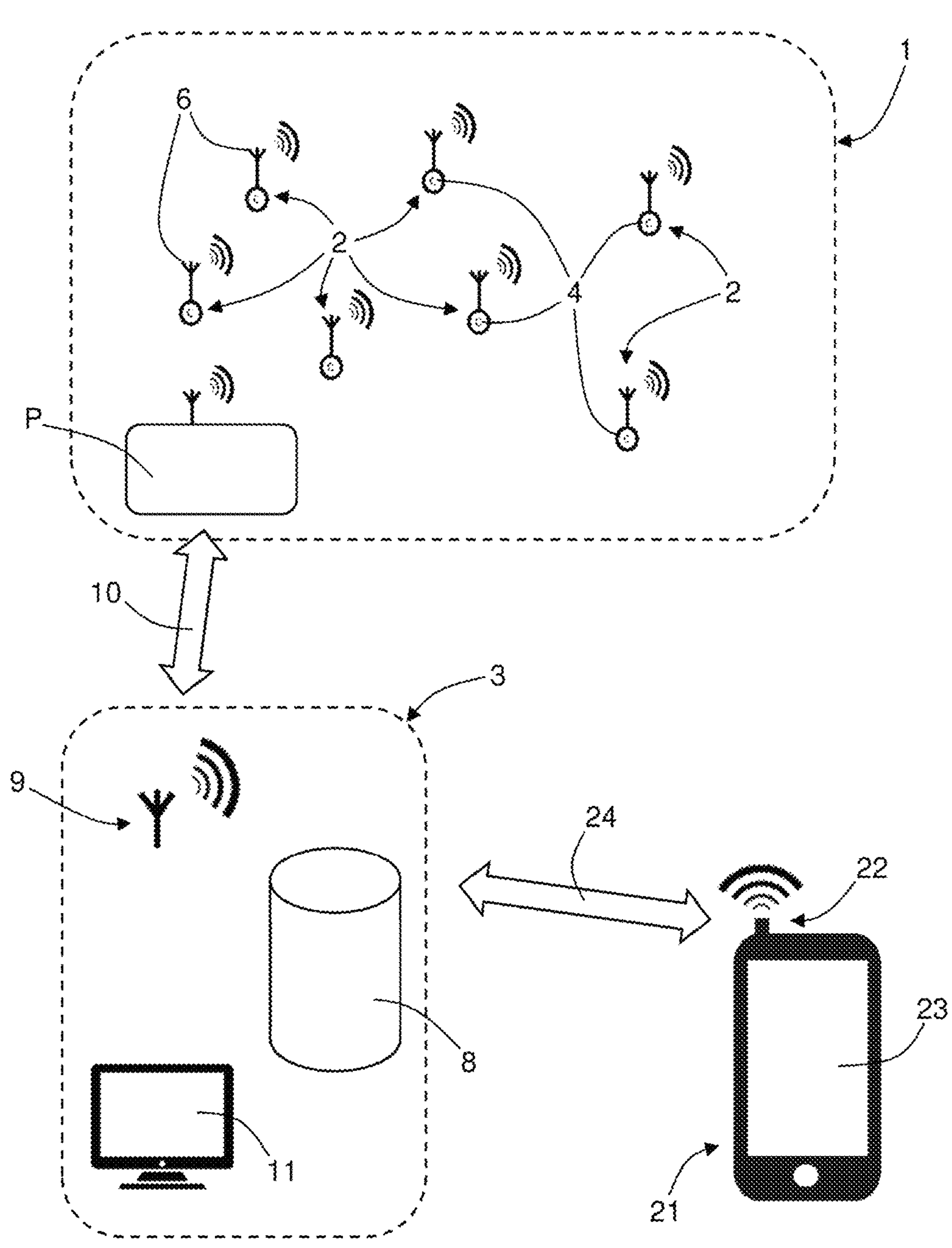

[Fig. 3]
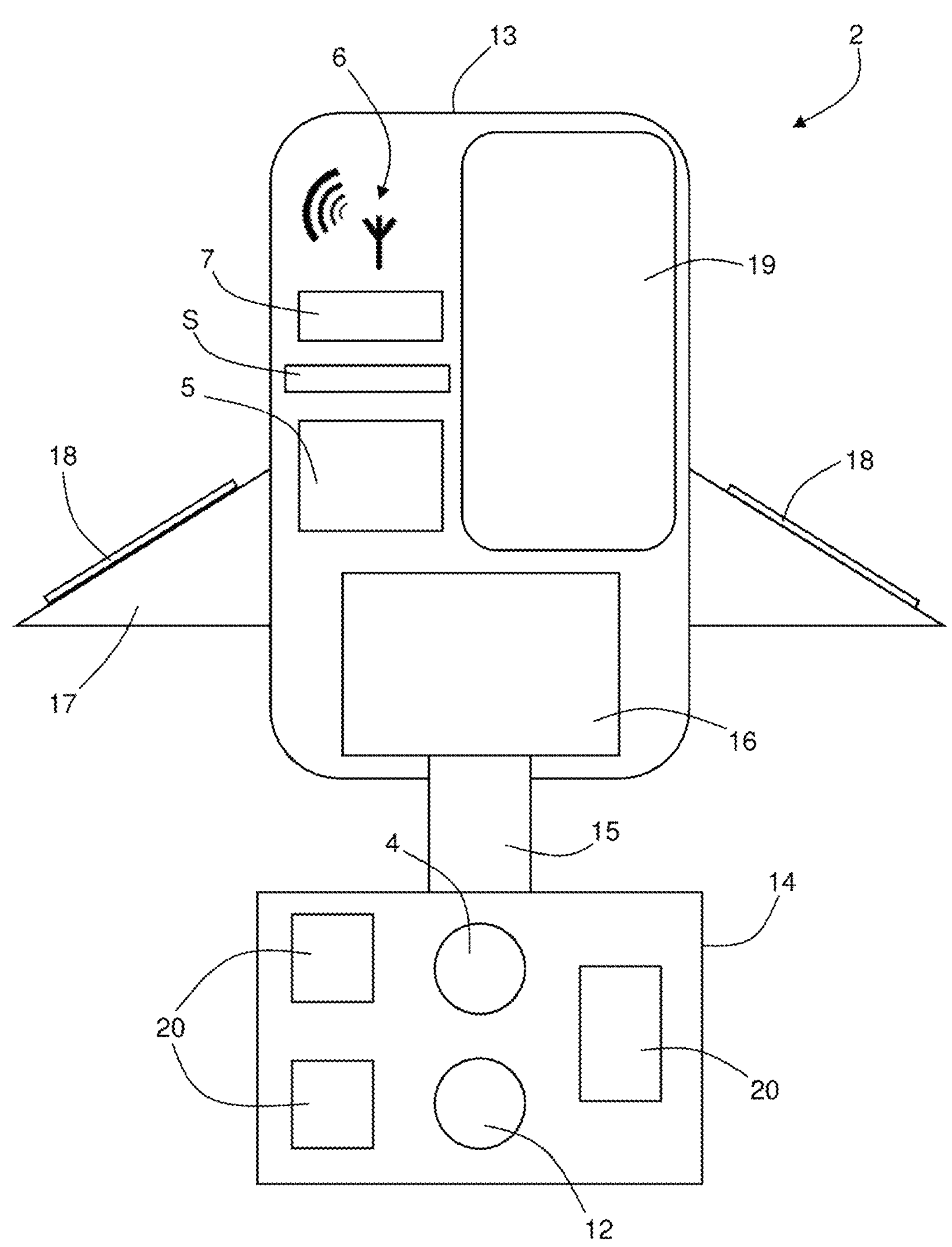

SYSTEM FOR DETECTING FIRE OUTBREAKS COMPRISING A PLURALITY OF DETECTION DEVICES FORMING A MESHING

CROSS-REFERENCE TO RELATED APPLICATIONS

This application is a Section 371 National Stage Application of International Application No. PCT/EP2023/053018, filed Feb. 7, 2023, which is incorporated herein by reference in its entirety and published as WO 2023/165790 A1 on Sep. 7, 2023, not in English.

FIELD OF THE DISCLOSURE

The field of the invention is that of the design of fire-fighting systems.

More specifically, the invention relates in particular to a system for detecting fire outbreaks.

BACKGROUND OF THE DISCLOSURE

For many years, the risks of fires in natural sites increase exponentially.

To preserve natural heritage, in particular private or public forests, it is necessary to prevent these fire risks and to be able to act as soon as the first signs of a fire appear.

For this purpose, several fire detection solutions exist to monitor the risk areas.

A first solution implements watchtowers.

These towers are occupied by monitors who, by means of binoculars, monitor the natural spaces in order to detect signs of fires and warn the services dedicated to extinguishing fires.

For an autonomous monitoring, the monitors may be replaced by optical and/or infrared cameras.

This first solution has many drawbacks.

First of all, the presence of monitors or cameras generates a considerable operating cost of the solution.

Indeed, the large number of monitors combined with the hourly labour cost makes this solution expensive. In addition, the human factor makes this solution fallible.

Moreover, when the monitors are replaced by cameras, the purchase cost of the cameras and maintenance thereof (frequent maintenance and cleaning) do not allow reducing the operating costs, and may even, on the contrary, increase them, all the more so as it is still necessary to mobilise several persons in order to continuously watch the screens retransmitting the images of the cameras.

Furthermore, the watchtowers being intended for the monitoring of several tens of square kilometres, in order to be detected, the fire should be large enough in order to generate a smoke that is dense enough to be detected at several kilometres. It is then generally too late to limit the damages caused by the fire. Besides the vast space to be monitored, other parameters limit the effectiveness of watchtowers, for example low Sun, penumbra or darkness, or misty atmospheres due, for example, to pollution, pollen or the presence of dust.

Finally, when a fire is detected, only an approximate geographical area of the location of the fire could be determined.

Hence, an accurate identification of the location of the fire is necessary before triggering the intervention of emergency services on site.

A second solution consists in using satellites which retransmit, in real-time, images of the places to be monitored.

This second solution proves to be even more expensive to implement than the first solution. On the other hand, the location of the fire is more accurate.

Nonetheless, to enable detection thereof, the fire should be large enough in order to generate a smoke that is dense enough to be detected at several kilometres. In general, a fire can be detected by this second solution only when it extends at least over a surface of 0.1 hectare (namely 1,000 square metres).

Thus, like for the first solution, when the fire is identified, it is already too late to limit its damages.

Moreover, when a cloud cover is present over the fire, the fire is masked and therefore not detectable by satellites.

A third solution consists in using flying vehicles such as helicopters, balloons or drones which fly over the risk areas.

Because of the complexity of operation (flight plan declaration requirement, maintenance of flying vehicles, and consideration of the weather conditions in particular), the use of this third solution does not enable an optimum or continuous monitoring of the risk areas.

Henceforth, the use of flying vehicles is programmed leaving, between each flight time, an unmonitored time of the risk areas.

Moreover, in areas that are particularly uneven and/or not covered by radio communication means, there might be a latency between the time of the identification of a fire and signalling thereof. This latency could then delay the intervention of the emergency services, and therefore cause damages due to the fire.

Because of their high cost, these three first solutions are used optimally only during so-called critical seasons, in particular drought periods which often correspond to the summer. During less critical seasons, these solutions are still used but in a more limited manner, or with reduced resources, for example less personnel for the watchtowers.

Thus, off these so-called critical seasons, the monitoring of natural spaces is limited, which increases the risks of destruction by fire.

A fourth solution consists in using sensors located at the heart of the risk areas.

These sensors, placed several meters in height in specific locations, allow detecting physical parameters, in particular the presence of gas, humidity and/or heat characteristic of fires.

These sensors are connected, by communication means, to a central unit which allows emitting a warning signal in order to trigger the intervention of the emergency services.

Although less expensive than the previously-described solutions, this fourth solution has some drawbacks.

For their operation, the sensors should be electrically powered. For this purpose, they are connected to batteries which should be recharged or replaced periodically.

Hence, this requires a tedious and costly maintenance operation. The absence of recharging or replacement of the battery makes the sensor unusable, which affects the effectiveness of the fire outbreak detection system.

In addition, the weather conditions could also influence the detection of fires.

Indeed, in case of significant wind, the smoke released by a fire outbreak could be directed to sensors remote from the fire area.

Under such circumstances, the indication of the location of the fire might be erroneous and lead to emergency services in the wrong place.

Also, a warning might be wrongly emitted because of a poor detection.

For example, the smoke released by a motor-propelled vehicle could be interpreted as a fire outbreak by a sensor, thereby generating the emission of a warning and a useless intervention of the emergency services.

SUMMARY

These objectives, as well as others that will appear later on, are achieved thanks to the invention an object of which is a system for detecting fire outbreaks, comprising:

- a plurality of detection devices forming a meshing of an area to be monitored, each detection device integrating recording means able to memorise a unique identifier and including at least one sensor of a physical characteristic of a fire outbreak, a processing unit and first communication means;
- a computer platform including a database relating to the detection devices and listing the unique identifiers of all detection devices and second communication means intended to cooperate with the first communication means to form a communication channel;

characterised in that each sensor of each detection device is an infrared-type camera, and in that each detection device is configured to:

- acquire, via the sensors, infrared images of the area to be monitored at regular intervals;
- detect a predetermined infrared level threshold in a first image, and
- compare the infrared level of a second image following the first image to detect a localised increase in infrared radiation, and
- if a localised increase in infrared radiation is detected, transmit to the computer platform, via the communication channel, a digital warning signal including the unique identifier of the detection device and geolocation data stored in the recording means.

Such a fire outbreak detection system allows accurately and rapidly determining a fire outbreak.

Indeed, the use of sensors in the form of infrared-type cameras allows detecting an abnormal rise in the temperature in the area to be monitored, even before smoke appears.

This then allows triggering the emergency intervention before excessive blaze causing the partial destruction of the area to be monitored.

Furthermore, the transmission of the unique identifier of the detection device from which the digital warning signal originates, as well as its geolocation, allows better guiding the emergency intervention since the intervention area could be accurately determined and delimited.

According to an advantageous aspect, the computer platform also comprises at least one display device for displaying the geolocation data of the detection device having emitted the digital warning signal.

This display device enables an operator to coordinate the intervention of the emergency services by identifying the intervention area.

Thus, the emergency services can load the equipment suited to the intervention area to ensure an efficient extinguishing of the fire without any risks of being confronted with uncertainties due to the geography of the intervention location, or the like.

According to another advantageous aspect, each detection device also integrates at least one digital camera, and the computer platform is parameterised so as to emit, to each detection device having transmitted a digital warning signal, a request to capture an instantaneous shot by the digital camera, each detection device being parameterised so as to execute said shot capture upon receipt of the request and to transmit it to the computer platform, via the communication channel, to be displayed on the display device.

Thus, it is possible to carry out a doubt removal thanks to the detection device, to confirm or reject the fire outbreak.

Indeed, an operator can visually determine whether the warning relates to a real fire outbreak or, on the contrary, it is related to an increase in an infrared level for example related to the presence of the thermal signature of an animal, a person or a vehicle with a heat engine circulating in the area to be monitored.

In particular, the doubt removal aims to limit useless emergency interventions, these useless interventions having a considerable cost and depriving the emergency teams of hardware and physical resources for real interventions, such as domestic fires or accidents. In addition, the doubt removal allows determining the size of the emergency team that is sent on the location of the fire, as well as the necessary hardware means.

According to another advantageous aspect, each detection device also integrates at least one digital camera, and the processing unit is parameterised so as to capture an instantaneous shot by the digital camera, and transmit said shot to the computer platform simultaneously with the digital warning signal, via the communication channel, to be displayed on the display device.

This enables an operator to identify a fire outbreak upon receipt of a digital warning signal.

Where necessary, the operator can visually confirm the fire outbreak, by emission of a request from the computer platform, using a second shot.

This enables rapid triggering of the emergency intervention in the event of a fire outbreak, without any risk of delay due to a poor connection.

According to another advantageous aspect, each detection device integrates means for moving the or each sensor and/or digital camera.

This allows limiting the number of sensors and digital cameras to ensure a 180° scanning of the area to be monitored by each sensor, or 360° when the detection device is installed at the top of a mast.

In other words, the moving means allow making the sensor and/or digital camera pivot to ensure an optimum monitoring of the area to be monitored.

By limiting the number of sensors and digital cameras, it is then possible to limit the cost of the fire outbreak detection system.

According to another advantageous aspect, each detection device comprises a protective case and an electric battery to power each sensor, the processing unit, the first communication means and/or the digital camera(s).

This configuration allows making each of the detection devices energetically autonomous.

Thus, the installation of the fire outbreak detection system is facilitated since it is not necessary to create an electrical power supply network for the detection devices.

According to another advantageous aspect, the case comprises an outer support, and each device integrates means for collecting solar energy for recharging the battery.

The outer support and the solar energy collection means allow further improving the energy autonomy of the detection devices since recharging of the battery can be done continuously, in parallel with the operation of the detection devices.

According to another advantageous aspect, the means for collecting solar energy are in the form of a photosensitive film.

Such a photosensitive film ensures recharging of the batteries independently of the sunlight conditions.

Indeed, the photosensitive characteristic of the film enables it to react to the presence of luminosity to ensure recharging of the battery, without requiring direct exposure to solar radiation.

Moreover, the use of the photosensitive film allows limiting the weight of the detection device since it does not require any carrier structure in comparison with some photovoltaic cells.

In addition, in forests, it is not rare that small branches, pine cones or fruits (for example chestnuts) fall off the trees with the risk of hitting the detection devices. Where appropriate, a transparent protective cover could be added to the detection device in order to protect the photosensitive film.

According to another advantageous aspect, the fire outbreak detection system also comprises at least one mobile computer unit held by at least one user of the system, each mobile computer unit integrating third communication means intended to cooperate with the second communication means to form a second communication channel, the mobile computer unit also integrating display means configured to reproduce the information displayed on the display device of the computer platform.

The mobile computer unit enables an operator to monitor any fire outbreaks remotely from the computer platform.

For example, this allows ensuring constant monitoring of the areas to be monitored without necessarily resorting to dedicated operators.

Henceforth, a small operator or a particular wishing to monitor his/her forestry domain can then use his/her mobile computer unit to trigger the emergency intervention by himself/herself if he/she considers it necessary, or intervene directly on the fire outbreak location if he/she is capable of doing so.

The invention also relates to a detection device for a fire outbreak detection system as described before, characterised in that it comprises:

- a protective case;
- at least one sensor housed in the case, in the form of an infrared-type camera;
- first communication means intended to cooperate with second remote communication means, and
- a processing unit coupled to the sensor and to the first communication means, the processing unit being configured to perform the comparison between two successive images originating from the sensor,
- means for recording an identifier and geolocation data.

Such a detection device enables the implementation of a fire outbreak detection system as described before, in a simple, rapid and autonomous manner.

Indeed, thanks to the detection and processing of the images directly by the sensor, the detection device allows transmitting a reliable digital warning signal which can be verified as described before.

Furthermore, the detection of a fire outbreak by infrared technology allows coordinating the rapid emergency intervention in order to limit the risks of destruction of the area to be monitored by the fire.

According to another advantageous aspect, the detection device also comprises at least one digital camera connected to the processing unit.

The digital camera allows verifying the veracity of the digital warning to trigger, or not, the intervention of an emergency team.

This verification may be done visually by an operator, in order to discern a fire outbreak from an animal, human or hardware temporary thermal signature.

The invention also relates to a method for detecting a fire outbreak in an area to be monitored by means of a fire outbreak detection system as described before, characterised in that it comprises the steps of:

- installing, in an area to be monitored, a plurality of detection devices in order to define a meshing of the area to be monitored;
- acquiring, via each sensor, infrared images of the area to be monitored at regular intervals;
- detect a predetermined infrared level threshold in a first image;
- compare the infrared level of a second image following the first image to detect a localised increase in infrared radiation, and
- if a localised increase in infrared radiation is detected, transmit to the computer platform, via the communication channel, a digital warning signal including the unique identifier of the detection device and geolocation data stored in the recording means.

Such a method allows creating an optimised environment for monitoring an area to be monitored.

Indeed, the creation of a meshing by the arrangement of the detection devices ensures an effective monitoring coverage.

Thus, the detection of a fire outbreak may be performed in redundancy by several detection devices, which allows increasing the credibility of a digital warning signal relating to a fire outbreak.

According to an advantageous aspect, the method also comprises a so-called doubt removal step consisting in:

- emitting, to each detection device having transmitted a digital warning signal, a request to capture an instantaneous shot by the digital camera, said shot being transmitted to the computer platform, via the communication channel, and
- verifying on the shots the presence of characteristics relevant to a fire outbreak.

The doubt removal allows avoiding a useless emergency intervention.

Thus, the expenses related to the useless movements of the emergency services are eliminated.

In addition, the hardware and physical resources of the emergency services can be preserved for real needs rather than being uselessly mobilised because of a false warning.

According to another advantageous aspect, the method also comprises a so-called doubt removal step consisting in:

- capturing an instantaneous shot by the digital camera, said shot being transmitted to the computer platform, via the communication channel, simultaneously with the transmission of the digital warning signal, and
- verifying on the shots the presence of characteristics relevant to a fire outbreak.

The transmission of a shot simultaneously with the digital warning signal allows fluidifying triggering of the emergency intervention.

Indeed, an operator can verify the presence of significant characteristics of a fire outbreak upon receipt of the digital warning signal, without resorting to an additional connection with the detection device, such a connection might delay the intervention of the emergency services in case of limitation of the bandwidth of the communication channel.

Where necessary, this doubt removal may be followed by a second doubt removal consisting in emitting, to each detection device having transmitted a digital warning signal, a request to capture an instantaneous shot by the digital camera, said shot being transmitted to the computer platform, via the communication channel, to verify, on the shots, the presence of characteristics relevant to a fire outbreak.

According to another advantageous aspect, the method also comprises a step consisting in carrying out a geolocation of each detection device during installation thereof in the area to be monitored.

This allows fluidifying the processing of the digital warning signals.

Thanks to the geolocation of the detection devices, when a warning is emitted, it is possible to accurately define an intervention location.

By accurately defining the intervention location, the emergency teams can then provide the equipment suited to the topography of the intervention location, to limit the risks of obstacles to their intervention.

According to another advantageous aspect, during the installation step, the detection devices are fastened on trees located in the area to be monitored, under the foliage of said trees.

Such fastening of the detection devices then ensures efficient and rapid detection of fire outbreaks.

This is explained by the fact that, by being situated under the canopy, and more specifically under the foliage of the trees, the detection devices can analyse the area to be monitored with no obstacles to identify any fire outbreaks, for the benefit of the protection of the area to be monitored.

BRIEF DESCRIPTION OF THE DRAWINGS

Other feature and advantages of the invention will appear more clearly upon reading the following description of preferred embodiments of the invention, given as illustrative and non-limiting examples, and from the appended drawings, wherein:

FIG. 1 is a schematic illustration of a first embodiment of a fire outbreak detection system, according to the invention;

FIG. 2 is a schematic illustration of a second embodiment of a fire outbreak detection system, according to the invention, FIG. 3 is a schematic cross-sectional illustration of a detection device of the fire outbreak detection system, according to the invention.

DETAILED DESCRIPTION OF ILLUSTRATIVE EMBODIMENTS

FIGS. 1 and 2 schematically illustrate preferred embodiments of a fire outbreak detection system, according to the invention.

The fire outbreak detection system allows detecting a fire outbreak in an area to be monitored 1 in order to allow rapidly warning the emergency services in order to avoid considerable spreading of the fire and preserving the area to be monitored 1.

For this purpose, the fire outbreak detection system comprises a plurality of detection devices 2 and a computer platform 3 intended to receive information from the detection devices 2.

As shown in FIGS. 1 and 2, the detection devices 2 are arranged in the area to be monitored 1 so as to create a meshing of the area to be monitored 1.

Referring to FIG. 3, each detection device 2 integrates, at least:

- a sensor 4 of a physical characteristic of a fire outbreak;
- a processing unit 5;
- first communication means 6;
- recording means 7, intended to memorise a unique identifier of the detection device 2.

More specifically, each sensor 4 of a physical characteristic of a fire outbreak is in this case an infrared-type camera.

Referring to FIGS. 1 and 2, the computer platform 3 includes:

- a database 8 relating to the detection devices 2 and listing the unique identifiers of all of the detection devices 2, and
- second communication means 9.

The second communication means 9 are intended to cooperate with the first communication means 6 of the detection devices 2 to form a communication channel 10.

Each detection device 2 is configured, at least, to:

- acquire, via the sensors 4, infrared images of the area to be monitored 1 at regular intervals;
- detect a predetermined infrared level threshold in a first image;
- compare the infrared level of a second image following the first image, to detect a localised increase in infrared radiation, and
- if a localised increase in infrared radiation is detected, transmit to the computer platform 3, via the communication channel 10, a digital warning signal including the unique identifier of the detection device 2 and geolocation data stored in the recording means 7.

For this purpose, the processing unit 5 integrates a computer allowing implementing a clock to determine the regular intervals.

The processing unit 5 also allows performing the comparison between the two images originating from the sensor 4.

To this end, the processing unit 5 integrates an algorithm allowing translating each image into infrared level areas.

From the two images, the algorithm allows isolating and determining an evolution of the intensity of the infrared radiation as well as its spatial evolution, i.e. the increase in the size of a strong infrared intensity on the second image. The algorithm may carry out this analysis of two successive images incrementally, i.e. between a first image and a second image, and then between the second image and a third image, and then between the third image and a fourth image, and so on. This allows maintaining, or not, the emission of the digital warning signal by the detection device 2.

As a non-limiting indication, the threshold from which the digital warning signal can be emitted by the detection device 2 is exceeded when the infrared level corresponds to a temperature higher than or equal to 60° C. for an image acquired during the daytime, and when the infrared level corresponds to a temperature higher than or equal to 50° C. for an image acquired during the nighttime. The differentiation between the day and the night may be carried out either in a photosensitive manner, or by a manual and predetermined configuration, or according to an image time-stamping law.

According to a first embodiment of the fire outbreak detection system, illustrated by FIG. 1, each detection device 2 is in direct communication with the computer platform 3.

In other words, the communication channel 10 is divided into as many channels as detection devices 2 comprised in the fire outbreak detection system.

According to a second embodiment of the fire outbreak detection system, illustrated by FIG. 2, each detection device 2 is in indirect communication with the computer platform 3.

More specifically, the fire outbreak detection system comprises a gateway P which splits the communication channel 10 into two portions.

Each of the detection devices 2 then communicates directly with the gateway P which forms an interface with the computer platform 3.

This configuration allows limiting the necessary range of the first communication means 6 to reduce the energy consumption of the detection devices 2. Also, this configuration enables detection devices 2 located outside the range of existing communication networks, to transmit the digital warning signal to the computer platform 3.

Thus, it is necessary that only the gateway P, which can be connected to an existing electrical network, has long-distance communication means to complete the communication channel 10. As a non-limiting example, the gateway P may use the Internet network to communicate with the computer platform 3.

This allows limiting the overall energy consumption of the fire outbreak detection system and using it in remote areas in which the electrical power supply from a national power grid is difficult, and even impossible.

Furthermore, when one of the detection devices 2 is not within a communication range of the gateway P or of the computer platform 3, its connectivity with the other detection devices 2, thanks to the meshing, can allow ensuring the transmission of a possible digital warning signal up to the computer platform 3 or the gateway P.

Hence, this allows maintaining monitoring of the area to be monitored 1 even though the detection devices 2 are remote from the gateway P or from the computer platform 3.

Referring to FIGS. 1 and 2, the computer platform 3 also comprises at least one display device 11 for displaying the geolocation data of the detection device 2 having emitted the digital warning signal.

By means of the display device 11, a user can verify the veracity of the digital warning signal, i.e. the presence of a fire outbreak in the area to be monitored 1.

For this purpose, each detection device 2 also integrates at least one digital camera 12.

The computer platform 3 is then parameterised so as to emit, to each detection device 2, and via the communication channel 10, having transmitted a digital warning signal, a request to capture an instantaneous shot by the digital camera 12.

To do so, the computer platform 3 then comprises an ad hoc communication interface enabling the user to interact with the detection devices 2 of the fire outbreak detection system.

Each detection device 12 is then parameterised so as to execute said shot capture upon receipt of the request and to transmit it to the computer platform 3 via the communication channel 10, to be displayed on the display device 11.

In other words, when a digital warning signal is emitted by at least one of the detection devices 2, a user can visually verify the presence of a fire outbreak in the area to be monitored 1 and triggers, where appropriate, the intervention of an emergency team to avoid spreading of the fire.

In particular, this allows avoiding the presence of an animal, or any other phenomenon, whose thermal signature is perceived as a localised increase in infrared radiation in the area to be monitored 1, being considered as a fire outbreak and resulting in the unjustified intervention of an emergency team.

Indeed, the unjustified intervention of an emergency team generates considerable expenses and a considerable resource mobilisation which could be assigned to a justified intervention.

Nonetheless, according to one variant, the processing unit 5 may be configured to control the digital camera 12 as soon as a fire outbreak is detected, so as to transmit a doubt removal shot simultaneously with the emission of the digital warning signal.

Triggering of the request will then be performed to confirm the first conclusions of the observation of the shot transmitted with the digital warning signal.

Referring to FIG. 3, the detection device 2 comprises a protective case 13 in which the processing unit 5, the first communication means 6 and the recording means 7 are housed.

The detection device 2 also comprises a cap 14 mechanically connected to the case 13, and inside which the or each sensor 4 and the or each digital camera 12 are housed.

The cap 14 is connected to the case 13 via an arm 15.

According to the embodiment illustrated in FIG. 3, the case 13 integrates means for moving the or each sensor 4 and the or each digital camera 12.

The moving means are in the form of motor means 16 to which the arm 15 is connected.

Thus, this allows driving the cap 14 in rotation via the arm 15 about an axis of rotation according to which the arm 15 extends.

This allows modifying the view angle of the sensors 4 and digital cameras 12 in order to ensure scanning of the area to be monitored 1.

According to a first variant, the detection device 2 comprises one single sensor 4 and one single camera 12.

Thus, the case 14 is movable to enable a rotation of the sensor 4 and of the digital camera 12 in order to scan the area to be monitored.

In this case, the sensor 4 and the digital camera 12 have an opening angle for capturing images comprised between 120° and 180°, and even comprised between 10° and 180°.

According to a second variant, each of the sensor 4 and the digital camera has an opening angle smaller than 180°, for example in the range of 60°.

In this case, the cap 14 integrates three sensors 4 and three digital cameras each angularly distributed at 60°. Thus, all of the sensors 4 and digital cameras 12 allow scanning of the area to be monitored 1 over 180°.

In this case, the motorisation of the enclosure 14 relative to the case 13 is not mandatory.

Nonetheless, in order to refine, where necessary, the shot capture, in particular by the digital camera 12 during the doubt removal, the detection device 2 may keep the motor means 16 allowing making the cap rotate relative to the case 13.

In general, depending on the opening angle of each sensor 4 and of each digital camera 12, the number of sensors 4 and of digital cameras 12 is selected so as to enable a 180° scanning of the area to be monitored by the detection device 2, where appropriate supplemented by the addition of the motor means 16 to enable the rotation of the cap 14.

In other words, if the number of sensors 4 and of digital cameras 12 and their respective opening does not allow, in a fixed manner, a 180° scanning of the area 1 to be monitored, then the detection device 2 will be provided with motor means 16 to enable pivoting of the cap 14 and thus enlarge the angular scanning area of the detection device 2.

Still with reference to FIG. 3, in order to make it energetically autonomous, the detection device 2 has an outer support 17 which extends radially around the case 13, and supports means 18 for collecting solar energy.

The detection device 2 then integrates an electrical battery 19 housed in the case 13 and connected to the collection means 18 to store the collected solar energy and deliver it to the different elements of the detection device 2, namely the or each sensor 4, the processing unit 5, the first communication means 6, the recording means 7, the or each digital camera 12 and, where appropriate, the motor means 16.

For example, the solar energy collection means 18 are in the form of a photosensitive film allowing capturing the luminosity in places not directly reached by the solar rays, such as, for example, in forests, under the canopy, and more particularly under the foliage of the trees.

According to one variant, the case 13 has transparent areas behind which photovoltaic cells are located. Reflectors may also be arranged on either side of each photovoltaic cell to allow amplifying the light radiation and, thus, maximising the production of electrical energy stored in the battery 19.

Other energy collection means may also be provided to power the battery 19 of the device. For example, these other capturing means may exploit wind energy.

In order to further improve the effectiveness of the detection device 2, the case 14 may also include secondary sensors 20 allowing detecting physical phenomena of a fire outbreak, such as the outside temperature, the hygrometry, the level of fine particles in the air, the carbon level, the dioxygen level, etc.

Moreover, each detection device 2 may integrate a backup battery S allowing powering the detection device 2 when the battery 19 is defective or recharging thereof is no longer ensured.

In this case, each detection device 2 may also include ad hoc means for detecting a failure of the battery 19 or of recharging thereof.

Referring to FIGS. 1 and 2, the fire outbreak detection system also comprises at least one mobile computer unit 21 integrating third communication means 22 and display means 23.

The third communication means 22 are configured to cooperate with the second communication means 9 of the computer platform 3 in order to form a second communication channel 24.

Thus, when a user does not have access directly to the computer platform 3, he can remotely interact with the latter, via the mobile computer unit 21.

In particular, the mobile computer unit 21 may be in the form of a computer, a smartphone or a digital tablet for example.

The display means 23 of the mobile computer unit 21 are configured to reproduce the information displayed on the display device 11 of the computer platform 3.

Moreover, the mobile computer unit 21 may integrate a computer application allowing either remotely transmitting the request to capture an instantaneous shot by the digital camera 12, or controlling the computer platform 3 to transmit said request.

The detection of a fire outbreak is carried out according to a method implementing the fire outbreak detection system that has just been described.

This method comprises the steps of:
- installing, in the area to be monitored 1, a plurality of detection devices 2 in order to define a meshing of the area to be monitored 1;
- acquiring, via each sensor 4, infrared images of the area to be monitored 1 at regular intervals;
- detecting a predetermined infrared level threshold in a first image;
- comparing the infrared level of a second image following the first image to detect a localised increase in infrared radiation and,
- if a localised increase in infrared radiation is detected, transmitting a digital warning signal to the computer platform 3 via the communication channel 10.

As explained before, to verify the veracity of a fire outbreak, the method also comprises a so-called doubt removal step consisting in:
- emitting, to each detection device 2 having transmitted a digital warning signal, a request to capture an instantaneous shot by the digital camera 12, said image being transmitted to the computer platform 3 via the communication channel 10, and
- verifying on the shots the presence of characteristics relevant to a fire outbreak.

This verification step is carried out visually by an operator who analyses the images to detect for example flames or smoke.

During the doubt removal, it might happen that the operator detects an animal, or any other phenomenon, whose thermal signature causes a localised increase in the infrared level between two successive images.

In this case, the operator does not trigger sending of emergency services since the doubt removal operation allows characterising the presence of an increase in infrared level between two successive images as being related to the presence of an animal, or any other phenomenon, and not a fire outbreak.

During the installation of each detection device 2 in the area to be monitored 1, a step consisting in carrying out a geolocation of each detection device 2 is performed.

In other words, when a detection device is installed in the area to be monitored 1, its positioning is reported.

This positioning may be performed either automatically in the case where the detection device is provided with a GPS module able to record in the recording means 7 the position or the geolocation of the device detection, or manually.

In this case, the operator carrying out the installation of the detection devices 2 uses a GPS beacon, or any suitable geolocation apparatus, and records, or manually enters via an ad hoc interface, the geolocation coordinates of the device in the recording means 7.

Thus, when a detection device 2 transmits a warning signal to the computer platform 3, via the first communication channel 10, it transmits, on the one hand, its unique identifier, and on the other hand its geolocation coordinates so that the computer unit could display the detection device 2 and its positioning to enable an operator to trigger the specific emergency response.

During installation thereof, the detection devices 2 are fastened directly on the trees located in the area to be monitored 1, under the foliage of the trees.

According to one variant, each detection device 2 may be associated with a mast and planted in the area to be monitored 1.

In this case, each detection device 2 is located at the top of said mast.

To enable a 360° detection, each detection device 2 may comprise several sensors 4 and digital cameras 12 depending on their respective opening angles.

Alternatively, each detection device 2 may comprise one single sensor 4 and one single digital camera 12, in which case, the motor means 16 allow making the sensor 4 and the digital camera 12 pivot to ensure a 360° monitoring.

As a non-limiting indication, the detection devices 2 are generally separated from one another by a distance comprised between 50 m and 200 m.

Nonetheless, the spacing distance between two detection devices 3 could be larger than 200 m, the first communication means 6 then being selected according to the spacing between the detection devices 2 and according to access to the communication standards and protocols by all of the detection devices 2 of the fire outbreak detection system.

The fire outbreak detection system that has just been described, and the method of implementation thereof, allow quickly and accurately identifying a fire outbreak in an area to be monitored, and triggering the intervention of an emergency team when necessary.

In other words, thanks to the doubt removal, an operator can verify that a digital warning signal actually relates to a fire outbreak and not the presence of an animal, a human or a motor-propelled vehicle, or any other phenomenon that could release heat, locally and temporarily.

Henceforth, by verifying the fire outbreak, the operator can trigger the intervention of emergency services only when necessary.

Thus, this allows limiting the unjustified interventions of emergency services, these interventions generating considerable costs and a mobilisation of considerable resources which could be assigned to a justified intervention.

Other advantageous features of the fire outbreak detection system that has just been described may be mentioned.

First of all, the energy management may be optimised by using components with a very low electrical consumption.

Afterwards, setting the main functions periodically on standby may be performed when they are not used, for example the interruption of the communications between the computer platform 2 and the detection devices 2.

In addition, low-energy consumption communication technologies may be used in the fire outbreak detection system.

Moreover, the use of high-efficiency and low self-discharge accumulators to form the batteries 19 may be selected.

Finally, the communications between the computer platform 3 and the detection devices 2 or the mobile computer units 21, i.e. the establishment of the first communication channel 10 and of the second communication channel 24 may implement technologies and protocols such as, non-exhaustively, 2G, 3G, 4G, 5G, LTE M1, Bluetooth or Wi-Fi, which are known and enable a low-energy consumption communication.

A communication network between the different detection devices 2 implanted in the area to be monitored 1 may also be provided to make additional passageways allowing transmitting the information by relaying them by the different detection devices 2 up to the gateway P or up to the computer platform 3.

The analysis of the infrared images may be carried out automatically by the processing unit 5 of each detection device 2, in a digital manner, i.e. using computing tools allowing detecting, between two images, the evolution of an average, a standard deviation, a derivative or an integral of the infrared radiation present on the images.

Moreover, thanks to the processing unit 5, each detection device 2 can carry out a self-learning allowing refining the detection of fire outbreaks.

Indeed, when each detection device 2 transmits a digital warning signal to the computer platform 3, and in the case where the doubt removal allows refuting the assumption of a fire outbreak, the processing unit 5 and the recording means 7 can integrate the characteristic data having caused the emission of the digital warning signal in order to limit sending of new warnings for similar detection configurations of a localised increase in the infrared level.

In other words, this allows identifying situations in which the presence of animals, humans, motor-propelled vehicles or any other phenomenon might be interpreted as a fire outbreak.

The database 8 of the computer platform 3 also allows recording the different digital warning signals progressively, in order to proceed with statistics in order to know, for example, the most risky places, or allow recognising or identifying a possible failure of a detection device 2 which would generate incessant yet erroneous warnings.

Furthermore, these statistics may allow identifying passage areas of animals, and for example migratory routes, or the evolution of any other environmental parameters such as temperature, hygrometry, fine particle level, or carbon dioxide level.

The computer platform 3, via the first communication channel 10, may also enable interaction with each detection device 2 located in the area to be monitored 1 in order to modify its operating parameters or simply perform update thereof.

This action may also be carried out from the remote computer unit 21, via the computer platform 3.

An exemplary aspect of the present disclosure therefore overcomes the drawbacks of the prior art.

More specifically, an exemplary aspect of the present disclosure provides a fire outbreak detection system enabling a safe, rapid, geographically accurate and permanent detection of fire outbreaks.

An exemplary aspect of the present disclosure provides such a fire outbreak detection system that is simple and inexpensive to use.

An exemplary aspect of the present disclosure provides such a fire outbreak detection system whose autonomy is increased, without involving frequent maintenance operations.

Although the present disclosure has been described with reference to one or more examples, workers skilled in the art will recognize that changes may be made in form and detail without departing from the scope of the disclosure and/or the appended claims.

The invention claimed is:

1. A system for detecting fire outbreaks, comprising:

a plurality of detection devices forming a meshing of an area to be monitored, each detection device comprising a recording device able to memorise a unique identifier, at least one sensor of a physical characteristic of a fire outbreak, a processing unit and a first communication device, wherein the processing unit is configured to record in the recording device geolocation data during installation of the detection device in the area to be monitored, either automatically by a global positioning system (GPS) module or by manual entry;

a computer platform comprising a database relating to the detection devices and listing the unique identifiers of all detection devices and a second communication device which is cooperable with the first communication device to form a communication channel;

wherein at least one of the plurality of detection devices or the computer platform is configured to place the first communication device and/or the communication channel periodically in a standby mode, in response to being not used, the placing in standby mode including interrupting communications between the computer platform and the at least one detection device;

wherein each sensor of each detection device comprises an infrared-type camera, and wherein each detection device is configured to:

acquire, via the at least one sensor, infrared images of the area to be monitored at regular intervals;

detect a predetermined infrared level threshold in a first image;

compare an infrared level of a second image following the first image to detect a localised increase in infrared radiation; and in response to a localised increase in infrared radiation being detected, transmit to the computer platform, via the communication channel, a digital warning signal including the unique identifier of the detection device and the geolocation data stored in the recording device.

2. The system according to claim 1, wherein the computer platform also comprises at least one display device for displaying the geolocation data of the detection device having transmitted the digital warning signal.

3. The system according to claim 2, wherein each detection device comprises at least one digital camera, and the computer platform is parameterised so as to emit, to each detection device having transmitted a digital warning signal, a request to capture an instantaneous shot by the at least one digital camera, each detection device being parameterised so as to execute said shot capture upon receipt of the request and to transmit the shot to the computer platform, via the communication channel, to be displayed on the display device.

4. The system according to claim 2, wherein each detection device also comprises at least one digital camera, and the processing unit is parameterised so as to capture an instantaneous shot by the at least one digital camera, and transmit said shot to the computer platform simultaneously with the digital warning signal, via the communication channel, to be displayed on the display device.

5. The system according to claim 4, wherein each detection device includes means for moving the at least one sensor and/or the at least one digital camera.

6. The system according to claim 2, wherein the system also comprises at least one mobile computer unit held by at least one user of the system, each mobile computer unit comprising a third communication device cooperable with the second communication device to form a second communication channel, the mobile computer unit also comprising a display configured to reproduce information displayed on the display device of the computer platform.

7. The system according to claim 1, wherein each detection device comprises a protective case and an electric battery to power at least one of each sensor, the processing unit, or the first communication device.

8. The system according to claim 7, wherein the case comprises an outer support, and each detection device comprises a solar collector for collecting solar energy for recharging the battery.

9. The system according to claim 8, wherein the solar collector for collecting solar energy is in the form of a photosensitive film.

10. The system according to claim 1, wherein:

each infrared image represents a spatial distribution of infrared radiation levels over the area to be monitored;

the processing unit is further configured to:

translate each infrared image into infrared level areas;

detect the predetermined infrared level threshold in the first image based on the infrared level areas; and compare the infrared level of the second image based on the infrared level areas to detect the localised increase in infrared radiation.

11. A detection device for a fire outbreak detection system, wherein the detection device comprises:

a protective case;

at least one sensor housed in the case, in the form of an infrared-type camera;

first communication device which is cooperable with a second remote communication device;

a processing unit coupled to the sensor and to the first communication device, the processing unit being configured to:

acquire, via the at least one sensor, infrared images of an area to be monitored at regular intervals;

detect a predetermined infrared level threshold in a first image;

compare an infrared level of a second image following the first image to detect a localized increase in infrared radiation;

in response to a localized increase in infrared radiation being detected, transmit to the second communication device, via the communication channel, a digital warning signal including a unique identifier of the detection device and geolocation data;

record in a recording device the geolocation data during installation of the detection device in the area to be monitored, either automatically by a global positioning system (GPS) module or by manual entry; and place the first communication device and/or the communication channel periodically in a standby mode, in response to being not used, the placing in standby mode including interrupting communications between the detection device and the second communication device; and the recording device for recording the unique identifier and the geolocation data.

12. The detection device according to the claim 11, which comprises at least one digital camera connected to the processing unit.

13. The detection device according to claim 11, wherein:

each infrared image represents a spatial distribution of infrared radiation levels over the area to be monitored; and the processing unit is further configured to:

translate each infrared image into infrared level areas;

detect the predetermined infrared level threshold in the first image based on the infrared level areas; and compare the infrared level of the second image based on the infrared level areas to detect the localised increase in infrared radiation.

14. A method for detecting a fire outbreak in the area to be monitored by using the fire outbreak detection system comprising:

a plurality of detection devices forming a meshing of an area to be monitored, each detection device comprising a recording device able to memorise a unique identifier, at least one sensor of a physical characteristic of a fire outbreak, a processing unit and a first communication device;

a computer platform comprising a database relating to the detection devices and listing the unique identifiers of all detection devices and a second communication device which is cooperable with the first communication device to form a communication channel;

wherein each sensor of each detection device comprises an infrared-type camera, and wherein each detection device is configured to:

acquire, via the at least one sensor, infrared images of the area to be monitored at regular intervals;

detect a predetermined infrared level threshold in a first image;

compare an infrared level of a second image following the first image to detect a localised increase in infrared radiation; and in response to a localised increase in infrared radiation being detected, transmit to the computer platform, via the communication channel, a digital warning signal including the unique identifier of the detection device and geolocation data stored in the recording device, and wherein the method comprises:

installing, in the area to be monitored, the plurality of detection devices in order to define the meshing of the area to be monitored, including the detection device recording in the recording device geolocation data during installation of the detection device in the area to be monitored, either automatically by a global positioning system (GPS) module or by manual entry;

acquiring, via each sensor, the infrared images of the area to be monitored at the regular intervals;

detecting the predetermined infrared level threshold in the first image;

comparing the infrared level of the second image following the first image to detect the localised increase in infrared radiation;

in response to the localised increase in infrared radiation being detected, transmitting to the computer platform, via the communication channel, the digital warning signal including the unique identifier of the detection device and the geolocation data stored in the recording device; and placing the first communication device and/or the communication channel periodically in a standby mode, in response to being not used, the placing in standby mode including interrupting communications between the computer platform and the at least one detection device.

15. The method according to claim 14, wherein the method also comprises a doubt removal step comprising:

emitting, to each detection device having transmitted a digital warning signal, a request to capture an instantaneous shot by a digital camera, said shot being transmitted to the computer platform, via the communication channel, and verifying on the shots presence of characteristics relevant to a fire outbreak.

16. The method according to claim 14, wherein the method also comprises a doubt removal step comprising:

capturing an instantaneous shot by a digital camera, said shot being transmitted to the computer platform, via the communication channel, simultaneously with the transmission of the digital warning signal, and verifying on the shots presence of characteristics relevant to a fire outbreak.

17. The method according to claim 14, wherein the method also comprises carrying out a geolocation of each of the detection devices during installation thereof in the area to be monitored.

18. The method according to claim 14, wherein, during the installing, the detection devices are fastened on trees located in the area to be monitored, under the foliage of said trees.

19. The method according to claim 14, wherein:

each infrared image represents a spatial distribution of infrared radiation levels over the area to be monitored; and the method comprises:

translating each infrared image into infrared level areas;

detecting the predetermined infrared level threshold in the first image based on the infrared level areas; and comparing the infrared level of the second image based on the infrared level areas to detect the localised increase in infrared radiation.

* * * * *